United States Patent
Kuzuyama et al.

(10) Patent No.: US 7,051,700 B2
(45) Date of Patent: May 30, 2006

(54) INTERNAL COMBUSTION ENGINE AND CONTROL DEVICE FOR THE INTERNAL COMBUSTION ENGINE

(75) Inventors: Hiroshi Kuzuyama, Aichi-ken (JP); Kenji Kawai, Aichi-ken (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 2 days.

(21) Appl. No.: 10/722,723

(22) Filed: Nov. 26, 2003

(65) Prior Publication Data
US 2005/0000486 A1   Jan. 6, 2005

(30) Foreign Application Priority Data
Nov. 28, 2002  (JP) .............................. 2002-344941
Feb. 25, 2003  (JP) .............................. 2003-046720

(51) Int. Cl.
*F02B 47/08*   (2006.01)
*F02M 21/00*   (2006.01)
*B60T 7/12*    (2006.01)

(52) U.S. Cl. .............. 123/299; 123/90.15; 123/568.14; 123/525

(58) Field of Classification Search ............. 123/90.11, 123/90.12, 90.15, 568.14, 294, 295, 299, 123/305, 27 GE, 525, 527, 575, 304, 431
See application file for complete search history.

(56) References Cited

U.S. PATENT DOCUMENTS

| | | | |
|---|---|---|---|
| 6,112,716 A * | 9/2000 | Tachibana ................... | 123/305 |
| 6,267,097 B1 * | 7/2001 | Urushihara et al. ......... | 123/305 |
| 6,336,436 B1 * | 1/2002 | Miyakubo et al. .......... | 123/295 |
| 6,405,694 B1 * | 6/2002 | Sato ......................... | 123/90.15 |
| 6,422,200 B1 * | 7/2002 | Morikawa et al. .......... | 123/305 |
| 6,425,367 B1 * | 7/2002 | Hiraya et al. ................ | 123/299 |
| 6,502,541 B1 * | 1/2003 | Abo et al. ................... | 123/295 |
| 6,508,229 B1 * | 1/2003 | Miyakubo et al. .......... | 123/305 |
| 6,546,910 B1 * | 4/2003 | Tanaka et al. ............... | 123/348 |
| 6,612,294 B1 * | 9/2003 | Hiraya et al. ........... | 123/568.14 |
| 6,807,956 B1 * | 10/2004 | Gaessler et al. ........ | 123/568.14 |
| 6,910,449 B1 * | 6/2005 | Strom et al. .............. | 123/90.16 |
| 2003/0154964 A1 * | 8/2003 | Gaessler et al. ........ | 123/568.14 |
| 2004/0244766 A1 * | 12/2004 | Fujieda et al. .............. | 123/299 |
| 2004/0261774 A1 * | 12/2004 | Eft ......................... | 123/568.13 |

FOREIGN PATENT DOCUMENTS

| JP | 2000-064863 | 2/2000 |
|---|---|---|
| JP | 2001-355462 | 12/2001 |

* cited by examiner

*Primary Examiner*—Hai Huynh
(74) *Attorney, Agent, or Firm*—Woodcock Washburn LLP (57) ABSTRACT

Disclosed is an internal combustion engine in which it is possible to provide, from the exhaust stroke to the intake stroke, a period T during which both an intake valve (14) and an exhaust valve (15) remain closed, the internal combustion engine being equipped with a fuel injection valve (24) capable of injecting fuel into a combustion chamber (16), the closing time EVC for the exhaust valve (15) being set to be on the advance side with respect to the intake top dead center, the fuel injected from the fuel injection valve (24) being pressurized together with a residual gas inside the combustion chamber (16) during the period T in which both the intake valve (14) and the exhaust valve (15) remain closed.

8 Claims, 7 Drawing Sheets

INTERNAL COMBUSTION ENGINE AND CONTROL DEVICE FOR THE INTERNAL COMBUSTION ENGINE

BACKGROUND OF THE INVENTION

1. Field of the Invention

The present invention relates to an internal combustion engine in which it is possible to set a period during which both an intake valve and an exhaust valve are closed from an exhaust stroke to an intake stroke.

2. Description of the Related Art

As is well known in the art, generally speaking, in a four-cycle internal combustion engine, an improvement in theoretical thermal efficiency is achieved through an increase in the ratio of specific heat of a working fluid by making an air fuel mixture lean. However, in the case of a gasoline engine, in which spark ignition is effected from the viewpoint of controlling the ignition timing, the flame core formation by ignition and flame propagation are rather difficult to perform, which leads to a problem in ignitability and limitations in the leaning of the air fuel mixture. As in the case of a gasoline engine, in the case of a gas engine using natural gas, propane gas or the like, ignition is rather difficult to effect, resulting in a problem similar to that in a gasoline engine. In the case of a diesel engine using light oil, the ignitability is satisfactory and thus self-ignition is performed, and substantial leaning is possible. However, it is liable to generate soot, and involves a problem regarding NOx discharge. Thus, from the viewpoint of increasing thermal efficiency and reducing NOx discharge, an improvement in ignitability is desired even in the case of a fuel not to be ignited easily, such as gasoline or natural gas.

From the viewpoint of promoting ignitability, an internal combustion engine is known which is equipped with a variable valve timing mechanism for adjusting the opening/closing timing for the intake and exhaust valves and in which it is possible to provide a period during which both the intake and exhaust valves remain closed from an exhaust stroke to an intake stroke (See, for example, JP 2000-64863 A (at pages 2–5, FIG. 4) and JP 2001-355462 A (at pages 2–3, and 7, and FIG. 8)). According to JP 2000-64863 A, under high load condition, an air fuel mixture is ignited by an ignition device, whereas, under low load condition, the timing for closing the exhaust valve is set such that advancement is effected during the exhaust stroke before the piston top dead center. Further, JP 2001-355462 A also discloses a technique in which the closing of the exhaust valve is controlled so as to be effected on the advance side with respect to the intake top dead center. By thus providing the period during which both the intake and exhaust valves remain closed on the advance side with respect to the intake top dead center, residual gas is trapped and newly sucked air is heated, thereby promoting ignition.

In the conventional technique described above, the ignitability depends on the heating effect of the residual gas trapped, so that, to promote the ignitability, it is necessary to augment the amount of residual gas trapped. However, when the amount of residual gas trapped increases, the heat loss and pump loss due to the compression and expansion of the gas increase, resulting in a deterioration in thermal efficiency. Further, since the intake amount of the newly sucked gas decreases, the load range allowing operation is restricted.

SUMMARY OF THE INVENTION

The present invention has been made in view of the above problems in the prior art. It is an object of the present invention to provide, from the viewpoint of enhancement in thermal efficiency and a reduction in NOx, an internal combustion engine and an internal combustion engine control device in which an improvement in terms of ignitability is achieved even with a fuel hard to ignite and in which an improvement in terms of thermal efficiency is achieved, making it possible to enlarge the load range allowing operation.

To solve the above-mentioned problems, according to claim 1 of the invention, there is provided an internal combustion engine in which it is possible to set a period during which both an intake valve and an exhaust valve are closed from an exhaust stroke to an intake stroke, wherein the engine includes a fuel injection valve capable of injecting fuel into the combustion chamber, a time for closing the exhaust valve is set to be at a timing on an advance side with respect to an intake top dead center, and the fuel injected from the fuel injection valve is pressurized together with a residual gas inside the combustion chamber during a period in which both the intake valve and the exhaust valve remain closed.

Here, the term "intake top dead center" refers to the piston top dead center around the point in time where the intake stroke is started.

Further, the expression "on the advance side with respect to the intake top dead center" refers to a point in time earlier than the point in time at which the intake top dead center is reached by the piston.

According to claim 1 of the invention, the closing of the exhaust valve is effected on the advance side with respect to the intake top dead center, and the intake valve and the exhaust valve are both brought into the closed state, so that, during the period from the closing of the exhaust valve to the reaching of the intake top dead center, the injected fuel is pressurized together with the residual gas as the piston rises. In this pressurizing process, the fuel attains high temperature and high pressure to be modified, and becomes an ignition accelerator. The expression "modification" refers to the converting of the fuel injected from the fuel injection valve into an ignition accelerator like formaldehyde as a result of attaining high temperature and high pressure by being pressurized together with the gas remaining in the combustion chamber. The expression also implies the reaction to produce an intermediate product such as OH in the course of the conversion reaction. When the intake valve is opened and air or air fuel mixture is newly sucked in, the new air or air fuel mixture is mixed with the high temperature residual gas including the fuel which is modified and easy to ignite, so that an improvement in ignitability is achieved. Thus, there is no need to set the closing time for the exhaust valve considerably on the advance side with respect to the intake top dead center for the purpose of promoting ignition as in the prior art, and it is possible to set the period during which both the intake valve and exhaust valve are closed to be short. As a result, it is possible to reduce the amount of residual gas trapped, and to restrain the heat loss and pump loss due to the compression and expansion of the residual gas, making it possible to restrain the deterioration in thermal efficiency. Further, since the amount of residual gas trapped can be reduced, it is possible to restrain a reduction in the amount of air or air fuel mixture newly sucked in, and to enlarge the load range allowing operation. Thus, from the viewpoint of enhancing thermal efficiency and reducing NOx, it is possible to realize an internal combustion engine in which it is possible to achieve an improvement in ignitability even with a fuel hard to ignite and in which it is possible to achieve an improvement in thermal efficiency, making it possible to enlarge the load range allowing operation.

In an internal combustion engine according to claim 2 of the invention, in claim 1 of the invention, a timing with which the fuel is injected from the fuel injection valve into the combustion chamber is immediately before the time for closing the exhaust valve.

In this construction, when the fuel is injected, the device is still in the state prior to the trapping of the residual gas and the starting of the pressurization, with the interior of the combustion chamber being at low pressure. Thus, it is also possible to lower the fuel injection pressure, thus simplifying the device construction.

In an internal combustion engine according to claim 3 of the invention, in claim 1 of the invention, a timing with which the fuel is injected from the fuel injection valve into the combustion chamber is immediately after the time for closing the exhaust valve.

In this construction, when the fuel is injected, both the intake valve and the exhaust valve are already in the closed state, so that there is no fear of injected fuel being leaked to the exterior of the combustion chamber. Further, it is immediately after the closing of the exhaust valve, which means the pressure in the combustion chamber has just started to rise, so that the fuel injection can be effected under a relatively low pressure. That is, it is possible to omit the pressurizing device for fuel injection, or, even if the pressurizing device is provided, it may be a pressurizing device of a type capable of fuel injection under low pressure.

In an internal combustion engine according to claim 4 of the invention, in claim 1 of the invention, the internal combustion engine is a premixed compression ignition engine in which an air fuel mixture prepared by previously mixing fuel with air is sucked into the combustion chamber.

In this construction, self-ignition is facilitated even with a fuel hard to ignite, such as gasoline or natural gas, making it possible to realize a premixed compression ignition of high thermal efficiency. Thus, enhancement in thermal efficiency is compatible with a reduction in NOx.

In an internal combustion engine according to claim 5 of the invention, in claim 1 of the invention, air mixed with no fuel is sucked into the combustion chamber, and fuel for main combustion is also injected from the fuel injection valve.

In this construction, an improvement in ignitability is achieved with the fuel pressurized with the residual gas, and then the fuel for main combustion is injected from the same fuel injection valve at a point near the compression top dead center to perform the main combustion. Thus, there is no need to separately provide a device for preparing air fuel mixture previously mixed with fuel, thus simplifying the device construction.

In an internal combustion engine according to claim 6 of the invention, in claim 1 of the invention, one of an amount of fuel injected from the fuel injection valve and a timing with which the fuel is injected into the combustion chamber can be varied, and the period during which both the intake valve and the exhaust valve remain closed is fixed.

In this construction, it is possible to adjust the amount of fuel injected or the amount of fuel modified through injection timing, so that, even if the period during which both the intake valve and the exhaust valve are closed is fixed, it is possible to control ignitability. Thus, it is possible to eliminate the need for a variable valve timing mechanism for adjusting the opening/closing timing of the intake and exhaust valves.

In an internal combustion engine according to claim 7 of the invention, in claim 1 of the invention, a time for opening the intake valve is set to be around the intake top dead center.

In this construction, the intake valve is opened in the state in which the piston has reached the intake top dead center (that is, in the state in which the residual gas after trapping has attained high temperature and high pressure, with the inner fuel being modified), so that the high temperature residual gas including modified is injected and caused to flow reversely to the intake side to be mixed with the air or air fuel mixture on the intake side to effect heating of the intake air. Thus, the intake air attains high temperature to achieve a further improvement in ignitability. Further, the residual gas after trapping is compressed substantially to maximum by the piston, and is mixed with the air or air fuel mixture on the intake side in a state in which it has attained so much the higher temperature/pressure. Thus, the amount of fuel modified at the point in time at which it is mixed with the air or air fuel mixture on the intake side, is increased, thereby realizing a further improvement in ignitability.

According to claim 8 of the invention, there is provided an internal combustion engine control device including: a variable valve timing mechanism capable of varying opening/closing timing for an intake valve and an exhaust valve; an intake/exhaust valve opening/closing timing control means for setting a time for closing the exhaust valve to be at a timing on an advance side with respect to an intake top dead center of a piston, and for controlling the variable valve timing mechanism such that there exists from an exhaust stroke to an intake stroke a period during which both the intake valve and the exhaust valve remain closed; and a fuel injection valve capable of injecting fuel into a combustion chamber such that the injected fuel is pressurized together with a residual gas inside the combustion chamber during the period in which both the intake valve and the exhaust valve remain closed.

Here, the expressions "intake top dead center" and "on the advance side with respect to the intake top dead center" imply the same things as in the case described above.

In this construction, the internal combustion engine is controlled by the intake/exhaust valve opening/closing timing control means such that the exhaust valve is closed at a point on the advance side with respect to the intake top dead center, with both the intake valve and the exhaust valve being brought into the closed state. As the piston rises during the period from the exhaust valve closing time to the intake top dead center, fuel is injected from the fuel injection valve so as to be pressurized with the residual gas, and in this pressurization process, the fuel attains high temperature and high pressure to be modified, and becomes an ignition accelerator. When the intake valve is opened and air or air fuel mixture is newly sucked in, the new air or air fuel mixture is mixed with the high temperature residual gas including the modified fuel and easy to ignite, so that an improvement in ignitability is achieved. Thus, there is no need to set the closing time for the exhaust valve considerably on the advance side with respect to the intake top dead center in order to promote ignition as in the prior-art technique, making it possible to set the period of time during which both the intake valve and the exhaust valve are closed to be short. As a result, it is possible to reduce the amount of residual gas trapped, and to restrain the heat loss and pump loss due to the compression and expansion of the residual gas, thereby making it possible to restrain a deterioration in thermal efficiency. Further, since it is possible to reduce the amount of residual gas trapped, it is possible to restrain a reduction in the amount of air or air fuel mixture newly sucked in, making it possible to enlarge the load range allowing operation. Thus, in an internal combustion engine, from the viewpoint of enhancing thermal efficiency and reducing NOx, it is possible to achieve an improvement in ignitability even with a fuel hard to ignite, achieving an improvement in thermal efficiency and enlarging the load range allowing operation.

Further, by changing the period during which the intake valve and the exhaust valve are both closed, it is possible to adjust the proportion and amount of fuel to be modified of the fuel injected from the fuel injection valve. Thus, it is possible to appropriately adjust the ignitability.

In an internal combustion engine control device according to claim 9 of the invention, in claim 8 of the invention, the fuel injection valve injects fuel into the combustion chamber at a timing immediately before the time for closing the exhaust valve.

In this construction, in an internal combustion engine equipped with this control device, when fuel is injected, the residual gas has not been trapped and started to be pressurized yet, with the interior of the combustion chamber being at low pressure, so that it is possible to make the fuel injection pressure low. Thus, it is possible to simplify the construction of the internal combustion engine equipped with this control device.

In an internal combustion engine control device according to claim 10 of the invention, in claim 8 of the invention, the fuel injection valve injects fuel into the combustion chamber at a timing immediately after the time for closing the exhaust valve.

In this construction, in an internal combustion engine equipped with this control device, when fuel is injected, the intake valve and the exhaust valve are both already in the closed state, so that there is no fear of the injected fuel leaking to the exterior of the combustion chamber. Further, since it is immediately after the closing of the exhaust valve, the pressure of the interior of the combustion chamber has just started to rise, so that it is possible to effect fuel injection under a relatively low pressure. That is, it is possible to omit the pressurizing device for fuel injection of the internal combustion engine equipped with this control device, or, if the pressurizing device is to be provided, it may be a pressurizing device of a type capable of injecting fuel under low pressure.

In an internal combustion engine control device according to claim 11 of the invention, in claim 8 of the invention, the intake/exhaust valve opening/closing timing control means controls the variable valve timing mechanism such that a time for opening the intake valve is set around the intake top dead center.

In this construction, in an internal combustion engine equipped with this control device, the intake valve is opened in a state in which the piston has reached the intake top dead center (that is, in a state in which the residual gas after trapping has attained high temperature and high pressure and in which the internal fuel has been modified), so that a high temperature residual gas containing a modified fuel is injected and caused to flow reversely to the intake side and is mixed with the air or air fuel mixture on the intake side to heat the intake air. Thus, the intake air attains high temperature, and a further improvement in terms of ignitability is achieved. Further, the residual gas after trapping is compressed substantially to a maximum degree by the piston, and is mixed with the air or air fuel mixture on the intake side, with its temperature and pressure being so much the higher. Thus, the amount of fuel modified at the point in time when it is mixed with the air or air fuel mixture on the intake side is further increased, which also helps to realize a further improvement in ignitability.

DESCRIPTION OF THE PREFERRED EMBODIMENTS

Preferred embodiments of the present invention will now be described with reference to the drawings.

Figure 1:
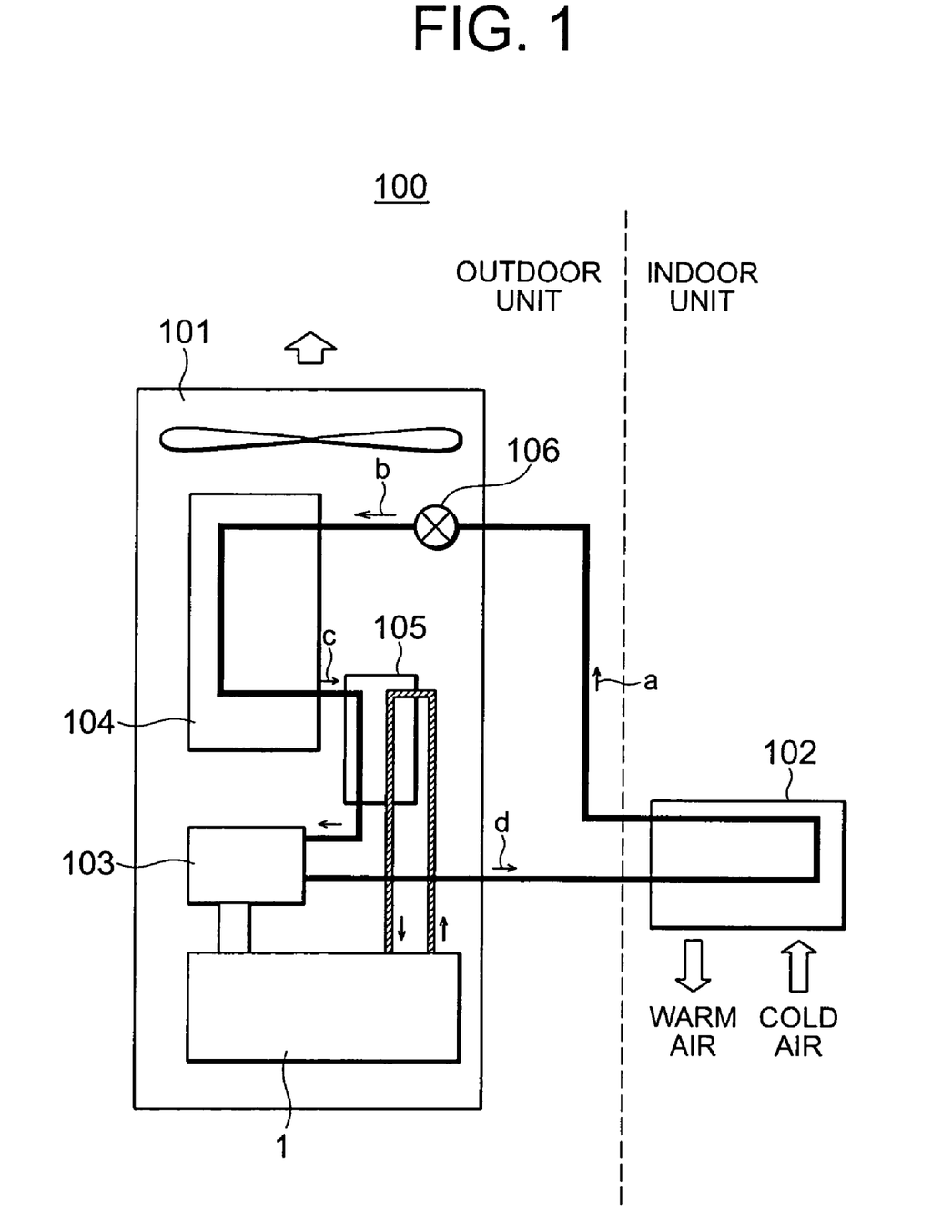
FIG. 1 is a system diagram showing an example of a gas heat pump equipped with an internal combustion engine.

FIG. 1 is a system diagram showing an example of a gas heat pump equipped with an internal combustion engine. An internal combustion engine according to the present invention can be used, for example, in a gas heat pump 100 shown in FIG. 1. In this gas heat pump 100, a heat pump cycle is driven by an internal combustion engine (gas engine) using natural gas or the like to effect air conditioning. The system example shown in FIG. 1 functions as a space-heating cycle.

The gas heat pump 100 is equipped with an outdoor unit 101 and an indoor unit 102. The outdoor unit 101 is equipped with an internal combustion engine (gas engine) 1 according to this embodiment, a compressor 103 driven by the internal combustion engine 1, heat exchangers 104 and 105, an expansion valve 106, etc. Refrigerant is condensed by the heat exchanger on the indoor unit 102 side and liquefied to thereby release heat, and, after heating the interior of the room (as indicated by the arrow a), passes through the expansion valve to thereby expand before becoming a liquid of a low temperature and a low pressure (as indicated by the arrow b). Then, the liquid is evaporated by the heat exchanger 104 of the outdoor unit 101 to absorb heat to become a gas of a low temperature and a low pressure (as indicated by the arrow c), and is compressed by the compressor 103 to become a gas of a high temperature and a high pressure (as indicated by the arrow d). Thereafter, the gas is liquefied again at the indoor unit 102 to thereby release heat, thus repeating a space-heating cycle. In the example shown in FIG. 1, the heat from the internal combustion engine 1 is utilized to circulate warm water, effecting heat exchange with refrigerant and the heat exchanger 105.

While the internal combustion engine 1 of this embodiment is applicable to the gas heat pump described above, this should not be construed restrictively. The internal combustion engine is also applicable to various 4-cycle internal combustion engines, such as automotive engines.

Figure 2:
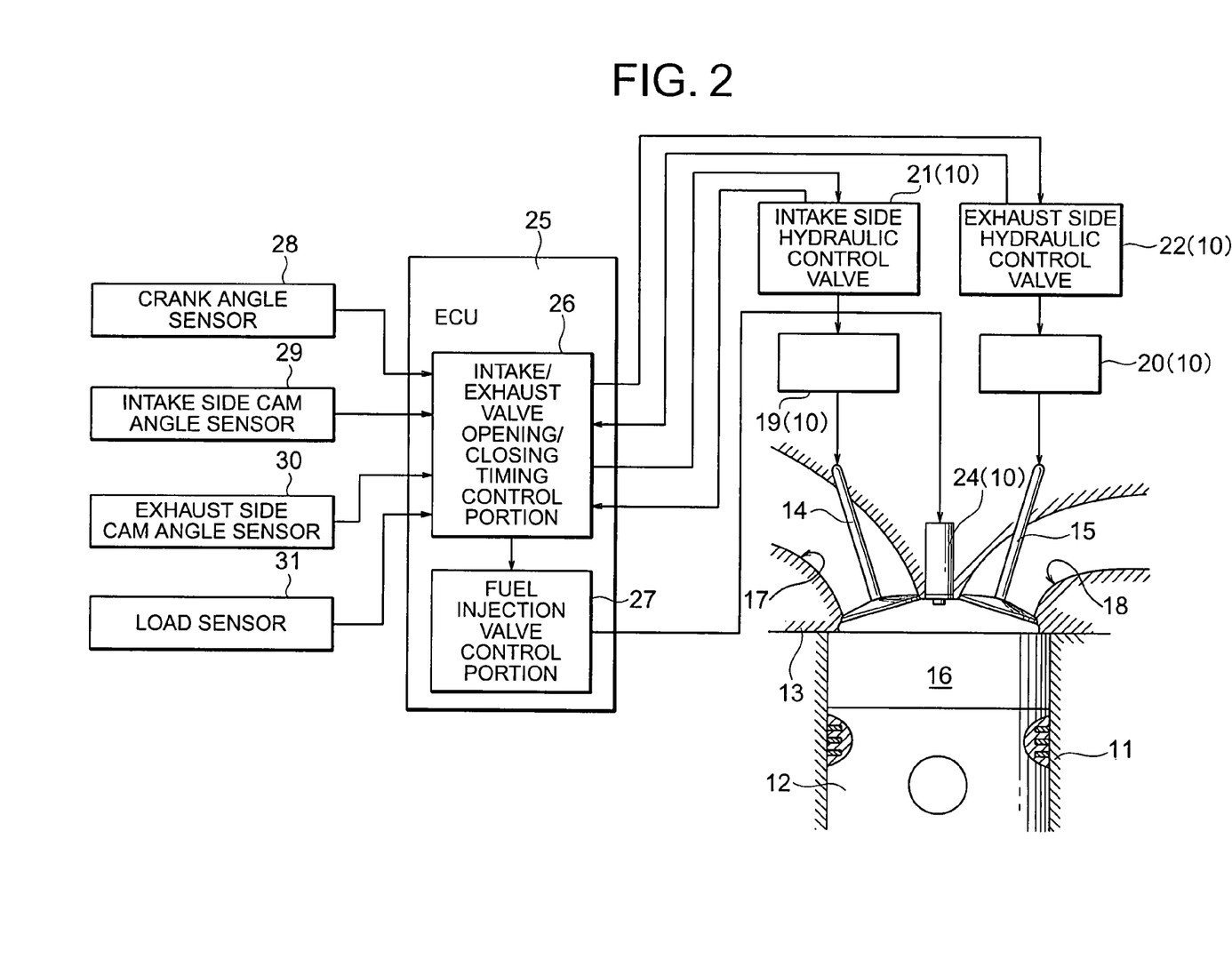
FIG. 2 is a schematic diagram coupled with a block diagram, illustrating a main portion of an internal combustion engine and its control system according to an embodiment of the present invention.
Figure 3:
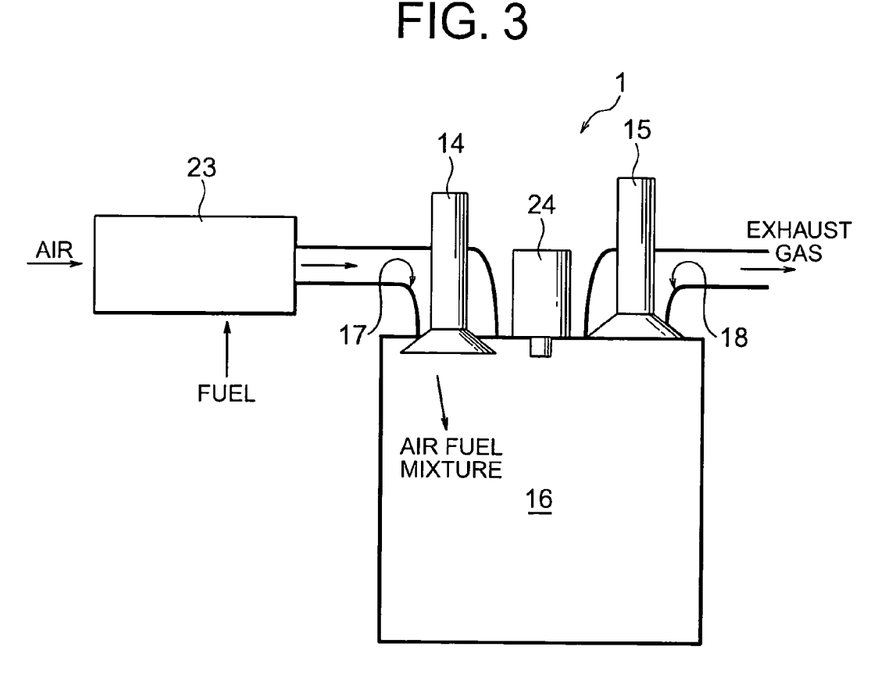
FIG. 3 is a schematic diagram showing a main portion of the internal combustion engine shown in FIG. 2.

In the following, the internal combustion engine 1 of this embodiment will be described. FIG. 2 is a schematic diagram coupled with a block diagram, illustrating a control system employed in main portion of the internal combustion engine 1, and FIG. 3 is a schematic diagram showing a part of the internal combustion engine 1. FIG. 2 shows the components of the internal combustion engine 1, including a cylinder block 11, a piston 12, a cylinder head 13, an intake valve 14, and an exhaust valve 15. The cylinder block 11, the piston 12, and the cylinder head 13 form a combustion chamber 16, and the cylinder head 14 has an intake port 17 and an exhaust port 18. Further, the internal combustion engine 1 has an intake side cam shaft and an exhaust side cam shaft (that are not shown), which are equipped with variable timing mechanism 19 and 20 capable of independently varying the opening/closing timings (valve opening time and valve closing time) for the intake valve 14 and the exhaust valve 15, making it possible to adjust the rotation phases of the cam shafts with respect to a crankshaft (not shown) Further, due to this arrangement, it is possible to arbitrarily set the period of time during which both the intake valve 14 and the exhaust valve 15 are closed. The variable valve timing mechanisms 19 and 20 perform adjustment of the opening/closing timing through hydraulic pressure control with an intake side hydraulic pressure control valve 21 and an exhaust side hydraulic pressure control valve 22. The mechanisms may be, for example, of the type as disclosed in JP 2001-355462 A.

Further, as shown in FIG. 3, the internal combustion engine 1 is a premixed compression ignition engine wherein an air fuel mixture prepared by previously mixing air with fuel sucks in the combustion chamber. By means of a mixer 23, fuel gas, such as natural gas or propane gas, is mixed with intake air, and sucked into the combustion chamber 16 through the intake port 17. Further, the internal combustion engine 1 is equipped with a fuel injection valve 24 capable of injecting fuel into the combustion chamber 16. Injected from this fuel injection valve 24 is a fuel that is the same as the fuel gas which is mixed with air by means of the mixer 23 for main combustion.

Next, an internal combustion engine control device 10 with which the internal combustion 1 is equipped will be described. In FIG. 2, the internal combustion engine control device 10 is equipped with the variable valve timing mechanisms (19 and 20) capable of varying the opening/closing timing for the intake and exhaust valves (14 and 15), hydraulic control valves (21 and 22), the fuel injection valve 24, and an engine control unit (ECU) 25 for performing various controls on the internal combustion engine 1.

The ECU 25 is equipped with an intake/exhaust valve opening/closing timing control portion (intake/exhaust valve opening/closing timing control means) 26 and a fuel injection valve control portion (fuel injection valve control means) 27 for controlling the amount of fuel injected from the fuel injection valve 24 and the timing with which the fuel is injected. And, connected to the ECU 25 are sensors, such as a crank angle sensor 28 mounted to the crankshaft and adapted to output a crank angle signal for each predetermined crank angle, an intake side cam angle sensor 29 and an exhaust side cam angle sensor 30 respectively mounted to the intake side cam shaft and the exhaust side cam shaft and adapted to output a cam angle signal for each predetermined cam angle, and a load sensor 31 adapted to output a setting operating condition for the indoor unit 102 as a load signal (or adapted to detect the operating condition of the compressor 103 and to output it as a load signal), and the signals from the sensors can be received by the ECU 25. Further, the ECU 25 is also connected to the hydraulic pressure control valves (21 and 22) and the fuel injection valve 24, and can control these valves as described below.

Further, as hardware components, the ECU 25 contains a CPU (Central Processing Unit) and a ROM (Read Only Memory). The ROM is a storage device for reading only, and stores various programs for controlling the operation of the internal combustion engine 1. The CPU performs various operations and processings based on various signals received and the various programs stored in the ROM, controlling the hydraulic control valves (21 and 22) and the fuel injection valve 24. That is, through a combination of these hardware and software components, the intake/exhaust valve opening/closing timing control portion 26 and the fuel injection valve control portion 27 are built in the ECU 25.

In response to the load signal from the load sensor 31, the intake/exhaust valve opening/closing timing control portion 26 sets the period during which both the intake valve 14 and the exhaust valve 15 are closed, and sets the opening/closing timing for the intake valve 14 and the exhaust valve 15 from an exhaust stroke to an intake stroke. At this time, the time for closing the exhaust valve 15 is set on the advance side with respect to the intake top dead center of the piston 12, and the time for opening the intake valve 14 is set, to the same degree, on the lag side with respect to the intake top dead center of the piston 12. In this way, the target opening/closing timing for the intake/exhaust valves (14 and 15) is set such that, from the exhaust stroke to the intake stroke, there is a period during which both the intake valve 14 and the exhaust valve 15 are closed. On the basis of the feedback signals from the crank angle sensor 28 and the cam angle sensors (29 and 30), the actual opening/closing timing for the intake/exhaust valves (14 and 15) is obtained to adjust the command for each hydraulic control valve and perform feedback control on the variable valve timing mechanisms (19 and 20) such that the opening/closing timing for the intake/exhaust valves (14 and 15) is in accord with the target opening/closing timing.

The fuel injection valve control portion 27 sets the target injection timing with which fuel is to be injected from the fuel injection valve 24 in accordance with the target opening/closing timing for the intake/exhaust valves (14 and 15) set by the intake/exhaust valve opening/closing timing control portion 26. Further, the fuel injection valve control portion 27 also sets the target amount of fuel to be injected. The amount of fuel injected from the fuel injection valve 24 is set based on the engine RPM computed from the output signal of the crank angle sensor 28 and the load of the internal combustion engine 1 computed from the output signal of the load sensor 31, etc. When the target injection timing is attained, a fuel injection command is issued to the fuel injection valve 24 to control the fuel injection valve 24 such that fuel is injected with the target timing and in the target injection amount.

Figure 4:
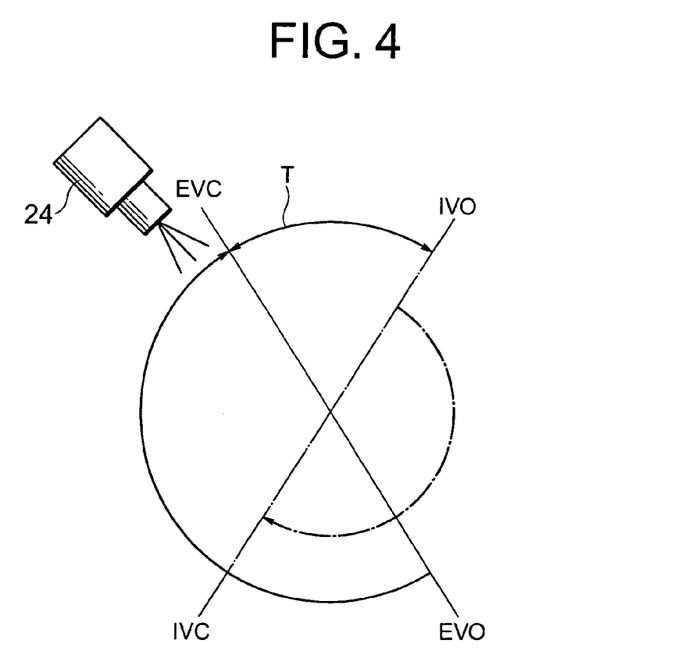
FIG. 4 is a schematic diagram showing the relationship between the opening/closing timing for the intake valve and the exhaust valve and the fuel injection timing in the internal combustion engine shown in FIG. 2.

FIG. 4 schematically shows the relationship between the opening/closing timing for the intake valve 14 and the exhaust valve 15 and the fuel injection timing. In the internal combustion engine 1, the exhaust valve 15 is first opened (EVO) at a point in time around the completion of the expansion stroke, and the exhaust stroke is started. Then, the above-described control is performed by the internal combustion engine control device 10, whereby fuel is injected from the fuel injection valve 24 into the combustion chamber 16 in a target injection amount corresponding to the engine RPM and load at a timing immediately before the closing of the exhaust valve 15 (EVC). After the fuel injection, the exhaust valve 15 is closed (EVC), and, after the intake top dead center, the period of time T during which both the intake valve 14 and the exhaust valve 15 are closed is started and continues until the intake valve 14 is opened (IVO). Thus, during the period from the closing of the exhaust valve (EVC) to the intake top dead center, the injected fuel is trapped in the combustion chamber 16 as the piston 12 rises, and is pressurized with the residual gas. The fuel, which attains high temperature and high pressure in this pressurization process, is modified, and becomes an ignition accelerator. After the intake top dead center has been passed, the intake valve 14 is opened (IVO), and an air fuel mixture is newly sucked in from the intake port 17 until the intake valve 14 is closed (IVC), and is mixed with the high temperature residual gas containing the modified fuel that can easily ignite, thereby improving the ignitability of the air fuel mixture. Thus, there is no need to set the closing time for the exhaust valve 15 (EVC) considerably on the advance side with respect to the intake top dead center in order to promote ignition, making it possible to set the period of time T during which both the intake valve 14 and the exhaust valve 15 are closed to be short.

As described above, when the fuel injection controlled by the internal combustion engine control device 10 is effected immediately before the closing of the exhaust valve 15 (EVC), at the time of fuel injection, the residual gas is still trapped and the pressurization has not been started yet, with the interior of the combustion chamber 16 being at low pressure, so that it is also possible to make the fuel injection pressure low, thereby simplifying the construction of the fuel system of the internal combustion engine 1. Further, it is possible to restrain to a minimum the leakage of fuel to the exterior through the exhaust valve 15 remaining open.

It is not always necessary for fuel injection to be effected immediately before the closing of the exhaust valve (EVC). It may be effected at any timing as long as it enables the injected fuel to be pressurized with the gas remaining in the combustion chamber 16. Further, it is also possible to control fuel injection so as to be effected not prior to the valve closing (EVC) (i.e., on the advance side) but later than that (i.e., on the lag side). In this case, it is desirable for the fuel injection to be controlled so as to be effected immediately after the valve closing (EVC). In the case in which the fuel injection is controlled so as to be effected immediately after the valve closing (EVC), both the intake valve 14 and the exhaust valve 15 are already in the closed state at the time of fuel injection, so that there is no fear of the injected fuel being leaked to the exterior of the combustion chamber 16. Further, since fuel injection is effected immediately after the valve closing (EVC), the pressure in the combustion chamber 16 has just started to rise, so that the fuel injection can be effected under a relatively low pressure. That is, it is possible to omit the pressurizing device for fuel injection, or if it is provided, the pressurizing device may be of a type just capable of causing fuel to be injected under low pressure.

In this embodiment, from the exhaust stroke to the intake stroke, the length of the period of time during which both the intake valve 14 and the exhaust valve 15 are closed, and the amount of fuel injected from the fuel injection valve 24, are controlled as follows.

The amount of fuel to be modified (hereinafter referred to as the "modification amount") is in proportion to the amount of fuel injected from the fuel injection valve 24, or to the length of the time during which the fuel injected from the fuel injection valve 24 is pressurized, i.e., the length of the period of time during which the intake/exhaust valves (14 and 15) are closed in the case, for example, in which fuel injection is effected immediately before the closing of the exhaust valve 15. When the modification amount increases, an improvement in ignitability is achieved, so that any defect in ignition is suppressed, or the ignition at the time of compression ignition is expedited (advanced).

When the internal combustion engine 1 is brought into a low load state, the amount of fuel supplied in the form of air fuel mixture is reduced, so that the ignitability is deteriorated. In this case, by extending the period of time during which both the intake and exhaust valves (14 and 15) are closed to thereby increase the modification amount, the ignitability is improved. By increasing the amount of fuel injected from the fuel injection valve 24, it is also possible to improve the ignitability. However, under low load condition, the target value of the amount of fuel to be supplied is small, so that the amount of fuel injected from the fuel injection valve 24 cannot be increased so much. Thus, priority is given to the control to extend the period of time during which both the intake/exhaust valves (14 and 15) are closed, achieving an increase in modification amount.

When the internal combustion engine 1 is brought into a high-speed rotation state, the amount of fuel injected from the fuel injection valve 24 is increased to thereby improved the ignitability, causing the ignition timing at the time of compression ignition to advance. In the state in which the engine RPM is high, if the opening/closing timing for the intake/exhaust valves (14, 15) with respect to the crank angle is the same, the period of time during which the valves are open, in particular, the length of time allowing intake becomes shorter. Thus, from the viewpoint of sucking in a sufficient amount of air fuel mixture, it is rather difficult to make long the period of time during which both the intake and exhaust valves (14, 15) are closed. Thus, the modification amount is increased mainly by increasing the amount of fuel injected from the fuel injection valve 24.

Figure 5:
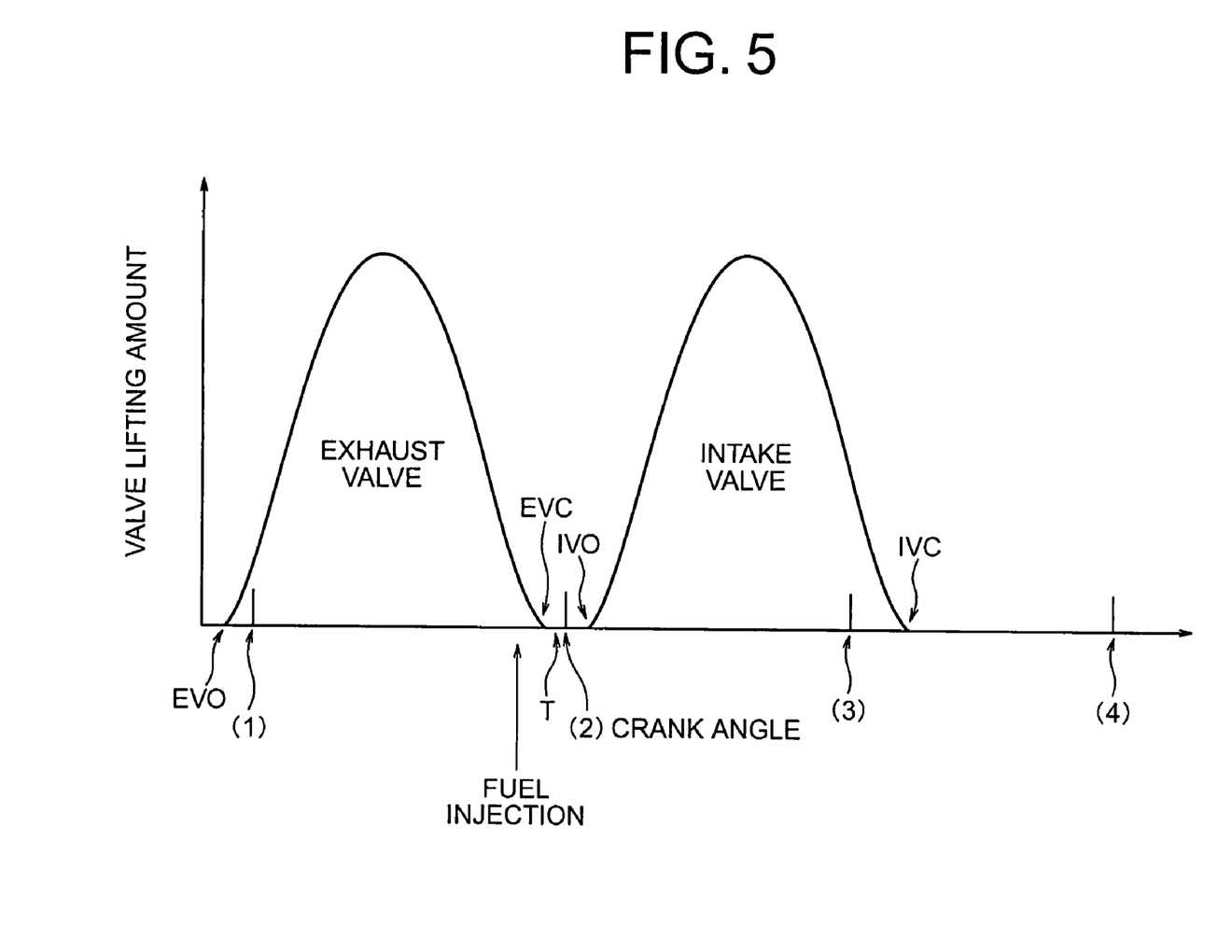
FIG. 5 is a diagram illustrating a control example for the internal combustion engine shown in FIG. 2.

FIG. 5 is a diagram illustrating a control example for the internal combustion engine 1, showing valve lifting amount with changes in crank angle. In the control example shown in FIG. 5, the engine RPM is high (high-speed rotation state). When the exhaust valve 15 is opened (EVO), the valve lifting amount of the exhaust valve 15 starts to increase, and the piston 12 reaches the bottom dead center (1). From this onward, the exhaust gas generated through combustion is discharged from the combustion engine 16 as the piston 12 rises. Then, the valve lifting amount of the exhaust valve 15 passes its peak and starts to be reduced, and, before the piston 12 reaches the intake top dead center (2), the exhaust valve 15 is closed (EVC). In this process, immediately before the closing of the exhaust valve 15 (EVC), fuel is ejected from the fuel injection valve 24 in a target amount allowing securing of the requisite modification amount. After the piston 12 has reached the intake top dead center (2), the intake valve 14 starts to open (IVO). During the period T in which both the intake valve 14 and the exhaust valve 15 are closed, the injected fuel is pressurized together with residual gas in the combustion chamber 16 and undergoes modification to become an ignition accelerator. After the intake valve 14 has been opened, intake is effected until the piston 12 reaches the bottom dead center (3), and compression stroke is effected until the compression top dead center (4) is reached. Then, self-ignition is effected around the compression top dead center (4) before the combustion stroke.

In this internal combustion engine 1, during the period T in which both the intake and exhaust valves (14 and 15) are closed, the injected fuel undergoes modification to become an ignition accelerator to thereby achieve an improvement in the ignitability of the air fuel mixture sucked in, so that, when the internal combustion engine 1 is in the high-speed rotation state, it is possible to substantially shorten the set period T, as shown in FIG. 5. This makes it possible to reduce the amount of residual gas trapped and to restrain the heat loss and pump loss due to the compression and expansion of the residual gas, making it possible to restrain a reduction in thermal efficiency. Further, since the amount of residual gas trapped can be reduced, it is possible to restrain a reduction in the amount of air fuel mixture newly sucked in, and it is also possible to enlarge the load range allowing operation. When the internal combustion engine 1 is in the low load state, the period T is controlled so as to be longer than in the high-speed rotation state. In case also, it is possible to set the period T shorter than in the conventional internal combustion engine.

Figure 6A:
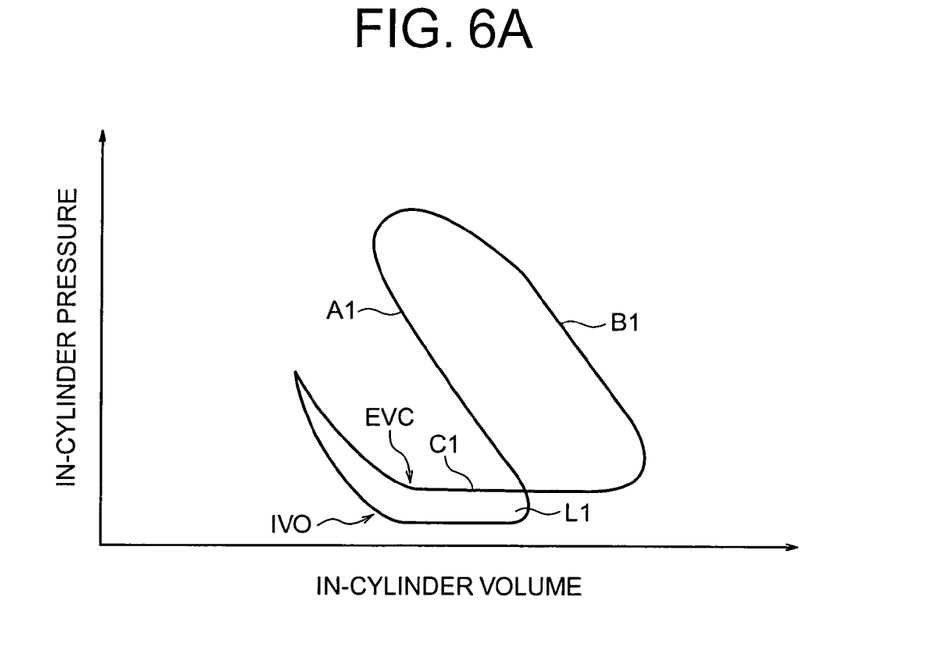
FIGS. 6A and 6B are diagrams showing the relationship between in-cylinder pressure and in-cylinder volume in order to illustrate a mechanism according to the present invention capable of restraining pump loss.
Figure 6B:
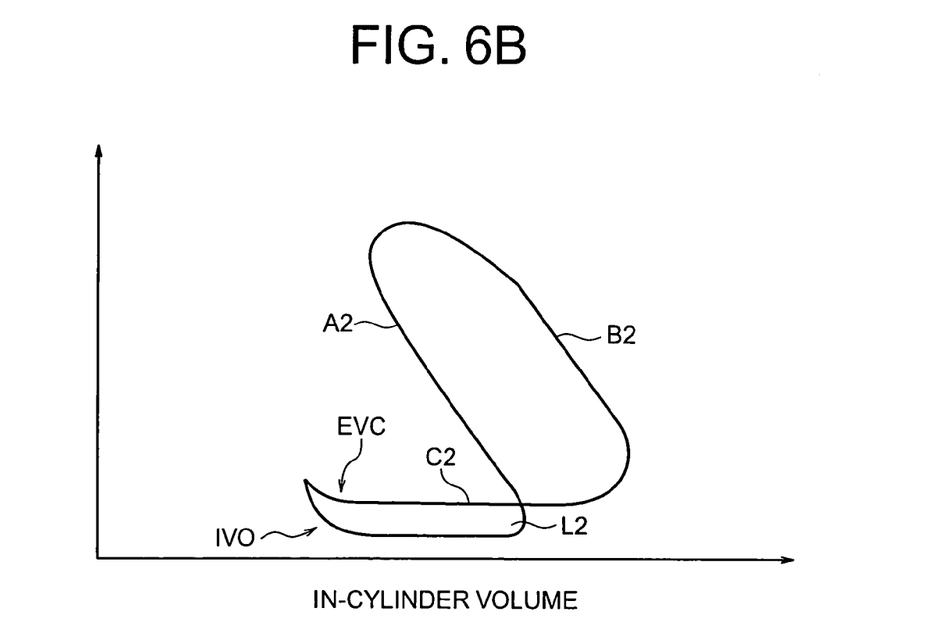

FIGS. 6A and 6B show the relationship between in-cylinder pressure and in-cylinder volume in order to illustrate a mechanism capable of restraining pump loss. FIG. 6A shows the relationship in a conventional internal combustion engine, and FIG. 6B shows that in the internal combustion engine 1. As shown in FIG. 6A, in the conventional internal combustion engine, in which exhaust stroke C1 is made after compression stroke A1 and combustion stroke B1, it is necessary for the period of T in which both the intake and exhaust valves are closed to be long, so that heat loss and pump loss L1 due to the compression and expansion of a large amount of residual gas at high temperature are generated. In contrast, in the case of the internal combustion engine 1 shown in FIG. 6B, if exhaust stroke C2 is made after compression process A2 and combustion process B2, it is possible to set the time for closing the exhaust valve 15 (EVC) later than in the prior art and to set the period during which both the intake and exhaust valves (14, 15) are closed to be short. Thus, the increase in pressure after the closing of the exhaust valve 15 (EVC) is less, making it possible to make the pump loss L2 less than the pump loss L1.

As described above, according to this embodiment, from the viewpoint of enhancing thermal efficiency and reducing NOx, it is possible to achieve an improvement in ignitability of the air fuel mixture even with a fuel hard to ignite and it is possible to achieve an improvement in thermal efficiency, making it possible to enlarge the load range allowing operation.

Further, according to this embodiment, by improving the ignitability of the air fuel mixture, there is no need to use a heating means such as a heater at the engine start, thus eliminating the need for such heating means.

Further, by varying the period during which both the intake valve and the exhaust valve are closed, it is possible to adjust the proportion and amount of the modified fuel of the fuel injected from the fuel injection valve. Thus, it is possible to appropriately adjust the ignitability. Further, since instantaneous control is possible with the fuel injection valve 24, it is possible to perform a control of higher responsiveness as compared with the control by a hydraulically operated variable valve timing mechanism in a high-speed rotation state.

Figure 7:
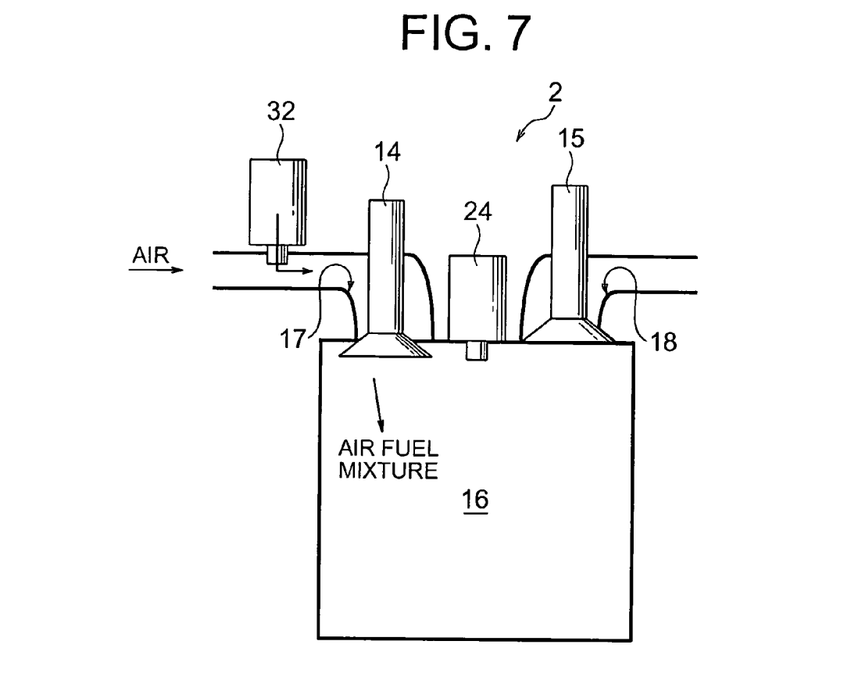
FIG. 7 is a schematic diagram showing a main portion of a modification of the internal combustion engine of the embodiment shown in FIG. 2.

The present invention is not restricted to the above-described preferred embodiment. It allows various modifications without departing from the scope of the claims. For example, the following modifications are possible:

(1) FIG. 7 is a schematic diagram showing a part of an internal combustion engine 2 obtained through modification of the embodiment of the above internal combustion engine 1. The components that are the same as those of the internal combustion engine 1 shown in FIG. 3 are indicated by the same reference numerals. While it is of the same construction of the internal combustion engine 1, the internal combustion engine 2 is equipped with no mixer 23 but is equipped with a port-injection injector 32. That is, while it is, like the internal combustion engine 1, a premixed compression ignition engine in which an air fuel mixture prepared by previously mixing fuel with air is sucked in, this internal combustion engine 2 is designed such that the fuel to be mixed is injected from the port-injection injector 32 to the intake port 17, in which it is scattered for mixing. In this way, by using a port-injection injector instead of a mixer, it is possible to obtain the same effect as that of the internal combustion engine 1. In the internal combustion engine 2, gasoline is mainly used as the fuel.

Figure 8:
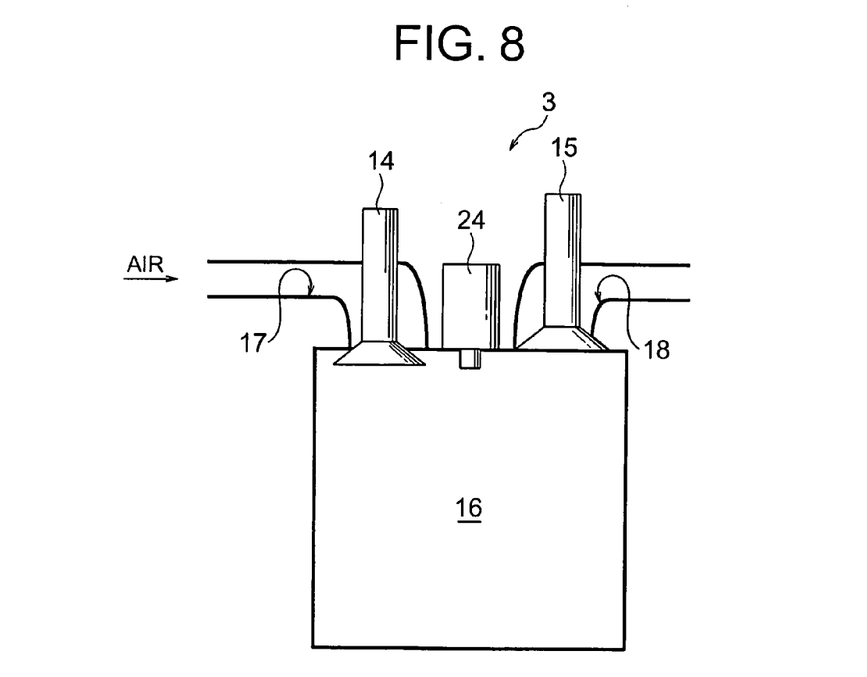
FIG. 8 is a schematic diagram showing a main portion of an internal combustion engine according to another embodiment of the present invention.

(2) FIG. 8 shows an internal combustion engine 3 according to another embodiment of the present invention. The components that are the same as those of the internal combustion engine 1 shown in FIG. 3 are indicated by the same reference numerals. While it is of the same construction as the internal combustion engine 1, the internal combustion engine 3 differs therefrom in that it is equipped with no mixer 23. That is, in the internal combustion engine 3, air mixed with no fuel is sucked into the combustion chamber 16, and fuel for main combustion is also injected from the fuel injection valve 24. The term "fuel for main combustion" refers to the fuel for the combustion in the combustion stroke (expansion stroke) following the compression stroke, and it does not refer to the fuel pressurized during the period T in which both the intake and exhaust valves (14 and 15) are closed. In the internal combustion engine 3, gasoline is mainly used as the fuel.

As in the internal combustion engine 1, in this internal combustion engine 3, the ignitability in the combustion chamber is improved by the fuel pressurized with the residual gas, and then fuel for main combustion is injected from the same fuel injection valve 24 around the compression top dead center to thereby effect main combustion. Thus, there is no need to separately provide a device for preparing an air fuel mixture by previously mixing fuel with air, thus simplifying the device construction.

(3) While in the embodiment of the internal combustion engine 1 described above the target value of the period T during which both the intake valve 14 and the exhaust valve 15 are closed is set by the intake/exhaust valve opening/closing timing control portion 26 of the ECU 25, this should not be construed restrictively. That is, it is also possible to adopt an internal combustion engine in which the amount of fuel injected from the fuel injection valve 24 or the timing with which the fuel is injected into the combustion chamber 16 can be varied and in which the period T during which both the intake valve 14 and the exhaust valve 15 are closed is fixed in advance. Here, while it is based on the premise that there is provided a fuel system capable of sufficiently pressurizing the fuel supplied to the fuel injection valve 24, the expression "timing with which the fuel is injected" refers to an arbitrary point in time during the period in which both the intake valve 14 and the exhaust valve 15 remain closed after the closing of the exhaust valve 15. In this case, it is possible to adjust the amount of modified fuel by varying the amount of fuel injected or the injection timing, so that, even if the period T during which both the intake valve 14 and the exhaust valve 15 remain closed is fixed, it is possible to control the fuel injection valve 24 according to variation in load setting to thereby control the ignitability. Thus, it is possible to eliminate the need for the variable valve timing mechanisms (19 and 20) for adjusting the opening/closing timing for the intake and exhaust valves (14 and 15).

(4) The internal combustion engine 1 is not restricted to one for use in a heat pump cycle. The present invention provides its effects if applied to engines for various uses such as automotive engines. Further, the internal combustion engines 2 and 3 may also consist of engines for various uses, such as heat pump cycle engines and automotive engines.

(5) It is also possible to use a gasoline fuel in the internal combustion engine 1, and to use a gas fuel such as natural gas in the internal combustion engines 2 and 3.

(6) The present invention is also applicable to an internal combustion engine equipped with not only a fuel injection valve but also an ignition plug and capable of both self-ignition and spark ignition.

(7) While in the internal combustion engine 1 of the above embodiment the time for closing the exhaust valve 15 is set on the advance side with respect to the intake top dead center of the piston 12, and the time for opening the intake valve 14 is set to the same degree on the lag side with respect to the intake top dead center of the piston 12 in order to restrain the pump loss, it is not always necessary for the advancement degree of the exhaust valve 15 to be the same as the lag degree of the intake valve 14.

Figure 9:
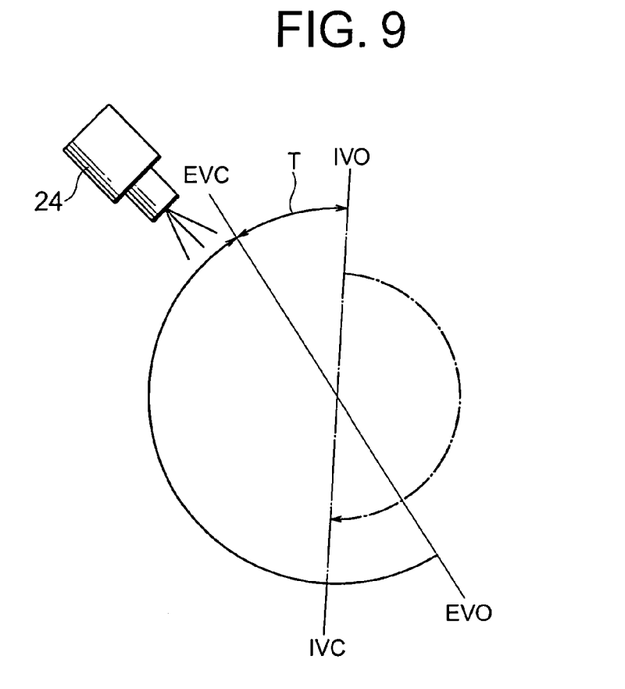
FIG. 9 is a schematic diagram showing another example of the relationship between the opening/closing timing for the intake valve and the exhaust valve and the fuel injection timing.
Figure 10:
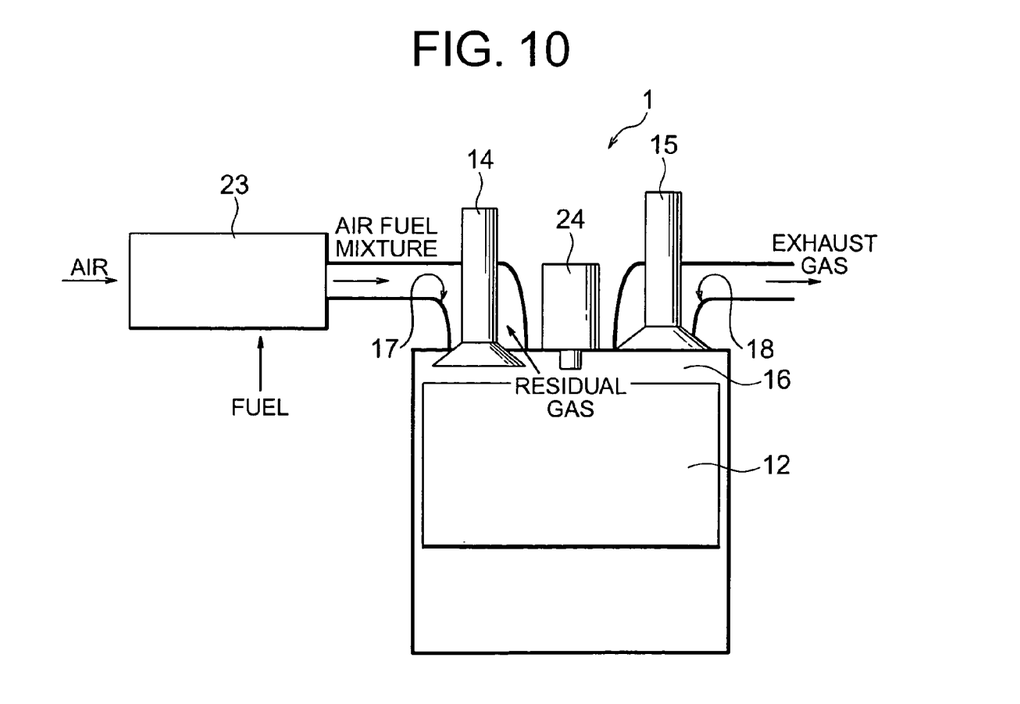
FIG. 10 is a diagram showing how residual gas is caused to flow backwards when the intake valve is opened in an internal combustion engine adopting the opening/closing timing of FIG. 9.

(8) For example, it is also possible to make the lag degree of the time for opening the intake valve 14 to be smaller than the advancement degree of the time for closing the exhaust valve 15, or, as schematically shown in FIG. 9, to reduce the lag degree substantially to zero, causing the intake valve 14 to be opened around the intake top dead center. In this case, the intake valve 14 is opened in the state in which the piston 12 has reached the top dead center, that is, in the state in which the residual gas after trapping has been compressed to attain high temperature and high pressure and in which the internal fuel has been modified. Thus, as shown in FIG. 10, when the intake valve 14 is opened, high-temperature residual gas containing modified fuel is injected and flows backward to the intake side to be mixed with the air fuel mixture on the intake side, thereby heating the intake air (In this process, the residual gas increases in flow velocity by flowing backward from the combustion chamber 16 into the intake port 17 via a small passage defined by the intake port 17 and the intake valve 14, and its kinetic energy is turned into heat to thereby promote the heating of the intake air). Thereafter, the piston 12 passes the top dead center, and the intake stroke starts, with the residual gas and the modified fuel being introduced again into the combustion chamber 16 together with the air fuel mixture on the intake side. Since the intake gas has attained high temperature by being heated as described above, a further improvement in ignitability is achieved. Further, as compared with the construction in which the opening of the intake valve 14 is effected on the lag side, the residual gas is compressed substantially to a maximum degree by the piston 12, and is mixed with the air fuel mixture on the intake side, with its temperature being so much the higher. Thus, the amount of fuel modified at the point in time when it is mixed with the air fuel mixture on the intake side increases, which also helps to achieve an improvement in ignitability.

According to claim 1 of the invention, from the viewpoint of enhancing thermal efficiency and reducing NOx, it is possible to achieve an improvement in ignitability even with a fuel hard to ignite and it is possible to achieve an improvement in thermal efficiency, making it possible to enlarge the load range allowing operation.

According to claim 2 of the invention, it is also possible to lower the fuel injection pressure, thus simplifying the device construction.

According to claim 3 of the invention, when the fuel is injected, both the intake valve and the exhaust valve are already in the closed state, so that there is no fear of injected fuel being leaked to the exterior of the combustion chamber.

According to claim 4 of the invention, self-ignition is facilitated even with a fuel hard to ignite, such as gasoline or natural gas, making it possible to realize a premixed compression ignition of high thermal efficiency. Thus, enhancement in thermal efficiency is compatible with a reduction in NOx.

According to claim 5 of the invention, there is no need to separately provide a device for preparing an air fuel mixture previously mixed with fuel, thus simplifying the device construction.

According to claim 6 of the invention, it is possible to eliminate the need for a variable valve timing mechanism for adjusting the opening/closing timing of the intake and exhaust valves.

According to claim 7 of the invention, the intake valve is opened in the state in which the piston has reached the intake top dead center (that is, in the state in which the residual gas after trapping has attained high temperature and high pressure, with the inner fuel modified), so that the high temperature residual gas including the modified fuel is injected and caused to flow reversely to the intake side to be mixed with the air or air fuel mixture on the intake side to effect heating of the intake air. Thus, the intake air attains high temperature to achieve a further improvement in ignitability. Further, the residual gas after trapping is compressed substantially to maximum by the piston, and is mixed with the air or air fuel mixture on the intake side in a state in which it has attained so much the higher temperature/pressure. Thus, the amount of fuel modified at the point in time at which it is mixed with the air or air fuel mixture on the intake side, is increased, thereby realizing a further improvement in ignitability.

According to claim 8 of the invention, in the internal combustion engine, from the viewpoint of enhancing thermal efficiency and reducing NOx, it is possible to achieve an improvement in ignitability even with a fuel hard to ignite, achieving an improvement in thermal efficiency and enlarging the load range allowing operation.

Further, by changing the period during which the intake valve and the exhaust valve are both closed, it is possible to adjust the proportion and amount of fuel to be modified of the fuel injected from the fuel injection valve. Thus, it is possible to appropriately adjust the ignitability.

According to claim 9 of the invention, it is possible to simplify the construction of the internal combustion engine equipped with this control device.

According to claim 10 of the invention, in the internal combustion engine equipped with this control device, when fuel is injected, the intake valve and the exhaust valve are both already in the closed state, so that there is no fear of the injected fuel leaking to the exterior of the combustion chamber.

According to claim 11 of the invention, in the internal combustion engine equipped with this control device, the intake valve is opened in a state in which the piston has reached the intake top dead center (that is, in a state in which the residual gas after trapping has attained high temperature and high pressure and in which the internal fuel has been modified), so that a high temperature residual gas containing a modified fuel is injected and caused to flow to the intake side and is mixed with the air or air fuel mixture on the intake side to heat the intake air. Thus, the intake air attains high temperature, and a further improvement in terms of ignitability is achieved. Further, the residual gas after trapping is compressed substantially to a maximum degree by the piston, and is mixed with the air or air fuel mixture on the intake side, with its temperature and pressure being so much the higher. Thus, the amount of fuel modified at the point in time when it is mixed with the air or air fuel mixture on the intake side is further increased, which also helps to realize a further improvement in ignitability.

What is claimed is:

1. An internal combustion engine in which it is possible to set a period during which both an intake valve and an exhaust valve are closed from an exhaust stroke to an intake stroke,
    wherein the engine includes a gas fuel injection valve capable of injecting gas fuel into the combustion chamber, a time for closing the exhaust valve is set to be at a timing on an advance side with respect to an intake top dead center, and the gas fuel injected from the gas fuel injection valve is pressurized together with a residual gas inside the combustion chamber during a period in which both the intake valve and the exhaust valve remain closed,
    wherein a timing with which the gas fuel is injected from the gas fuel injection valve into the combustion chamber is immediately before the time for closing the exhaust valve or immediately after the time for closing the exhaust valve.

2. An internal combustion engine according to claim 1, wherein the internal combustion engine is a premixed compression ignition engine in which an air-gas fuel mixture prepared by previously mixing gas fuel with air is sucked into the combustion chamber.

3. An internal combustion engine according to claim 1, wherein air mixed with no gas fuel is sucked into the combustion chamber, and wherein gas fuel for main combustion is also injected from the gas fuel injection valve.

4. An internal combustion engine according to claim 1, wherein one of an amount of the gas fuel injected from the gas fuel injection valve and a timing with which the gas fuel is injected into the combustion chamber can be varied, and wherein the period during which both the intake valve and the exhaust valve remain closed is fixed.

5. An internal combustion engine according to claim 1, wherein a time for opening the intake valve is set to be around the intake top dead center.

6. An internal combustion engine control device comprising:
    a variable valve timing mechanism capable of varying opening/closing timing for an intake valve and an exhaust valve;
    an intake/exhaust valve opening/closing timing control means for setting a time for closing the exhaust valve to be at a timing on an advance side with respect to an intake top dead center of a piston, and for controlling the variable valve timing mechanism such that there exists from an exhaust stroke to an intake stroke a period during which both the intake valve and the exhaust valve remain closed; and
    a gas fuel injection valve capable of injecting gas fuel into a combustion chamber such that the injected gas fuel is pressurized together with a residual gas inside the combustion chamber during the period in which both the intake valve and the exhaust valve remain closed, wherein the gas fuel injection valve injects gas fuel into the combustion chamber at a timing immediately before the time for closing the exhaust valve or immediately after the time for closing the exhaust valve.

7. An internal combustion engine control device according to claim 6, wherein the intake/exhaust valve opening/closing timing control means controls the variable valve timing mechanism such that a time for opening the intake valve is set around the intake top dead center.

8. An internal combustion engine control method that uses an internal combustion engine control device, the device comprising:
    a variable valve timing mechanism capable of varying opening/closing timing for an intake valve and an exhaust valve;
    an intake/exhaust valve opening/closing timing control means; and
    a gas fuel injection valve,
    wherein the intake/exhaust valve opening/closing timing control means sets a time for closing the exhaust valve to be at a timing on an advance side with respect to an intake top dead center of a piston, and for controlling the variable valve timing mechanism such that there exists from an exhaust stroke to an intake stroke a period during which both the intake valve and the exhaust valve remain closed, and
    the gas fuel injection valve injects gas fuel into a combustion chamber at a timing immediately before the time for closing the exhaust valve or immediately after the time for closing the exhaust valve such that the injected gas fuel is pressurized together with a residual gas inside the combustion chamber during the period in which both the intake valve and the exhaust valve remain closed.

* * * * *